ND STATES PATENT...

United States Patent [19]
Clark

[11] 3,987,341
[45] Oct. 19, 1976

[54] OPEN NEUTRAL PROTECTION
[75] Inventor: W. Randolph Clark, Bedford, Mass.
[73] Assignee: I-T-E Imperial Corporation, Spring House, Pa.
[22] Filed: Apr. 3, 1975
[21] Appl. No.: 564,857

[52] U.S. Cl. ............................ 317/18 B; 317/18 C; 317/27 R; 317/31; 317/48; 324/51; 340/253 B; 340/256
[51] Int. Cl.² ......................................... H02H 3/14
[58] Field of Search .............. 317/18 B, 18 C, 18 A, 317/27 R, 31, 48; 324/51; 340/255, 256, 248 N, 253 B

[56] References Cited
UNITED STATES PATENTS

| | | | |
|---|---|---|---|
| 2,598,775 | 6/1952 | Fischer | 324/66 |
| 3,426,342 | 2/1969 | De Langis | 317/18 B X |
| 3,611,053 | 10/1971 | Rowell | 317/18 B |
| 3,659,152 | 4/1972 | De Langis | 317/18 B |
| 3,714,517 | 1/1973 | Stacek | 317/18 B X |
| 3,766,434 | 10/1973 | Sherman | 317/18 B X |

Primary Examiner—R. N. Envall, Jr.
Assistant Examiner—Patrick R. Salce
Attorney, Agent, or Firm—Ostrolenk, Faber, Gerb & Soffen

[57] ABSTRACT

An artificial neutral voltage derived from the voltages on both energized lines of a three-wire, single-phase energy supply system is compared to the voltage on the neutral line. Comparator means energize interrupter means to cause the cessation of a current flow in the energized lines of the circuit in the event the neutral line voltage is more than a predetermined value above or below the artificially derived neutral voltage for protection in the event an open neutral line condition occurs even when loads are not attached to the energized power lines.

7 Claims, 3 Drawing Figures

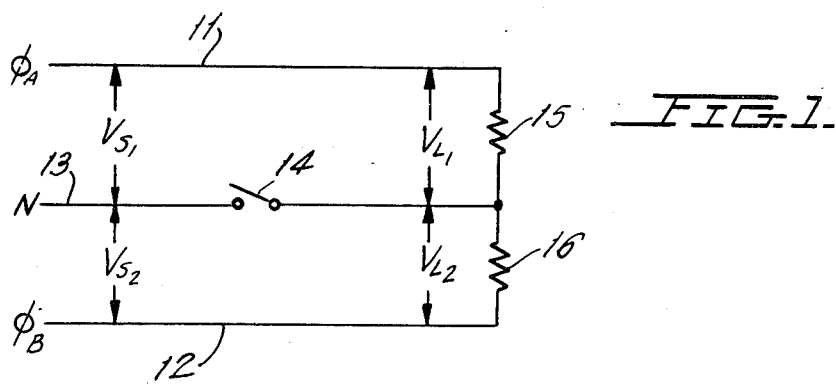
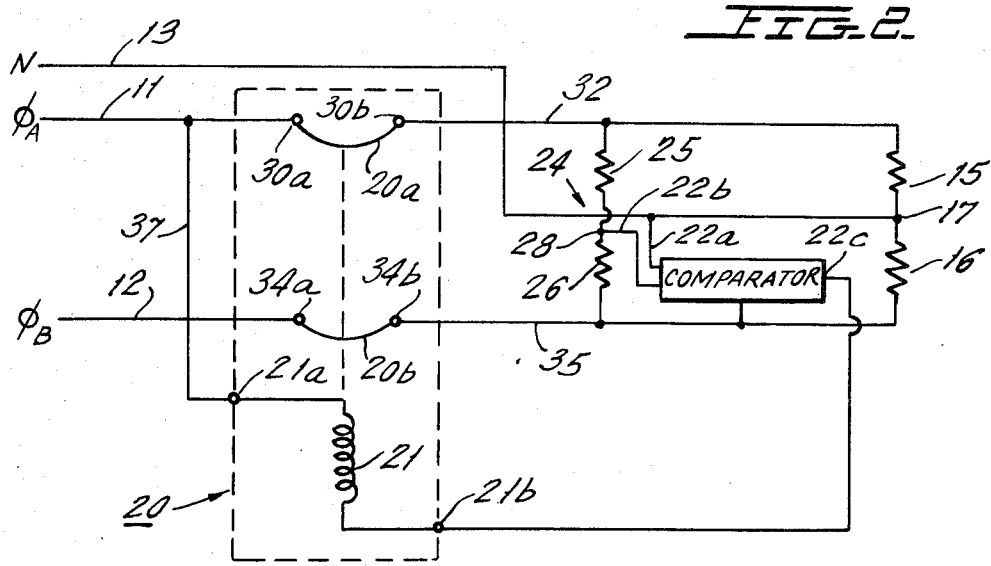
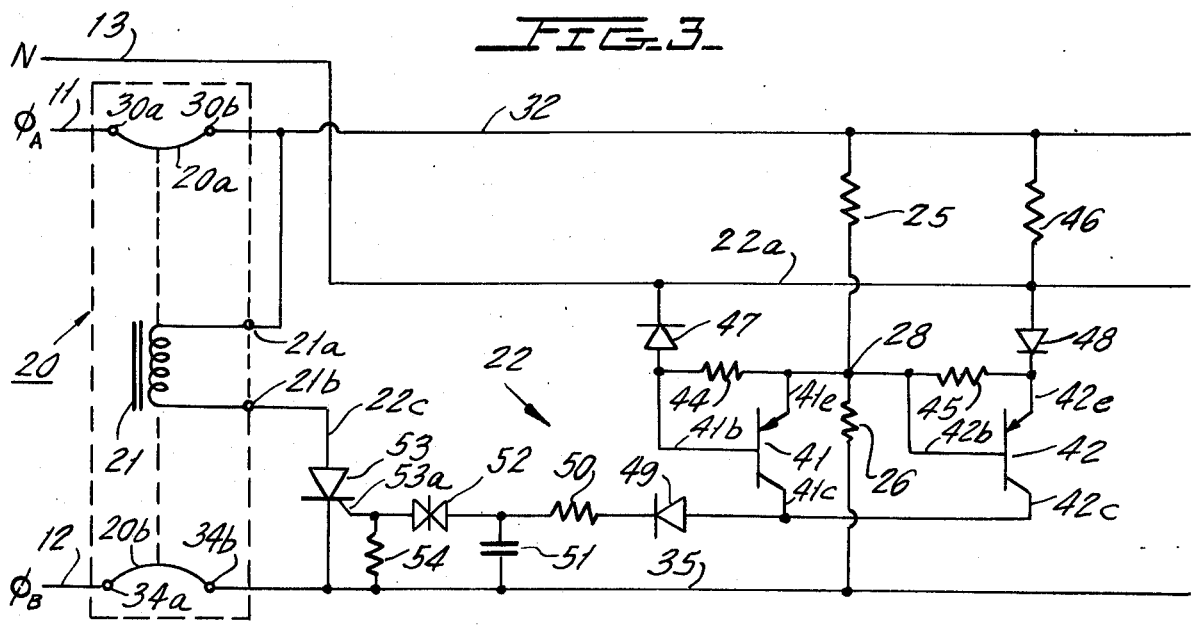

OPEN NEUTRAL PROTECTION

BACKGROUND OF THE INVENTION

This invention relates to power line protection and more particularly to a novel method and apparatus for interrupting the flow of current in a three-wire, single-phase energy supply circuit in the event an open neutral line condition is created even when loads are not connected to the energized lines.

It is well known in the power distribution art that the neutral line of a three-wire, single-phase energy supply system may become an open circuit due to improper installation or physical damage. If unequal loads are connected between such open neutral line and each of the pair of energized lines, the load having the lower power requirement, and therefore the higher resistance, will have more than one half the total line-to-line voltage appearing across that load and may be damaged by the resulting additional voltage. Similarly, the higher wattage load will have less than half the line-to-line voltage appearing across that load and may be damaged by the resulting severe undervoltage. Additionally, many large home and commercial appliances operate from three-wire single-phase mains and utilize the neutral line as shock-protective means connected to the equipment case. An open neutral line to such installation creates a severe personnel shock hazard.

Open neutral line protection methods and circuits previously known to the art have either been complex or operable only if a load was connected between each energized line and the neutral line.

BRIEF SUMMARY OF THE INVENTION

It is desirable to provide open neutral line protection even when a load is not connected between any of the energized lines and the neutral line of the single-phase energy supply circuit and to realize such protection with as simple and as low cost a protective method and circuit as possible.

In accordance with the invention, a method and apparatus realizing the above-stated goal of protecting a three-wire, single-phase energy supply circuit having two energized lines and a neutral line includes generating an artificial neutral voltage at an output of first means coupled to both the energized lines; comparing the amplitudes of the artificial neutral voltage and a voltage on the neutral line in second means having an output adapted to be energized in the event the artificial neutral and neutral line voltages differ by at least a predetermined value; and interrupting a flow of current in the pair of energized lines by circuit means responsive to the energization of the second means output.

In one preferred embodiment, the comparator means is a semiconductor circuit adapted to energize a trip coil to actuate the interruption means when the neutral line has either opened or has a voltage thereon differing from the artificial neutral voltage by more than the predetermined amount even when a load is not connected between either or both energized lines to the neutral line.

There has just been described a method and apparatus for protecting a three-wire, single-phase energy supply circuit in the event of an open neutral line condition even when a load is not connected from either energized conductor to the neutral line.

Accordingly, it is one object of the present invention to provide a method for detecting an open neutral line condition in a three-wire, single-phase energy supply circuit.

It is a further objective of the present invention to detect such open neutral line condition even when there is no load attached from either energized line to the neutral line.

It is a still further object to provide a circuit capable of detecting such open neutral line energy supply condition and interrupting the flow of current in such a circuit responsive to such condition.

These and other objects of the present invention will become apparent to one skilled in the art upon consideration of the following detailed description of the following drawings.

DESCRIPTION OF THE DRAWINGS

FIG. 1 is a schematic diagram of a three-wire, single-phase system illustrating the problem sought to be solved;

FIG. 2 is a schematic diagram illustrating the open neutral line protection method provided in accordance with the invention; and FIG. 3 is a schematic diagram illustrating an open neutral line protection circuit in accordance with the principles of the present invention.

DETAILED DESCRIPTION OF THE INVENTION

Referring to FIG. 1, a three-wire, single-phase energy supply circuit includes a first energized conductor 11 having a first voltage thereon having phase A; a second energized conductor 12 having a second voltage thereon having phase B, which phase is 180° rotated from phase A; and a neutral line 13 normally having a zero voltage thereon. In the normal condition, the instantaneous amplitude of first source voltage $V_{s1}$ between phase A conductor 11 and neutral line 13 is equal to the instantaneous amplitude of second source voltage $V_{s2}$ between phase B conductor 12 and neutral line 13. For illustrative purposes, a switch 14 is placed to indicate an intact or broken neutral line 13 by the respective closed or open condition thereof. When switch 14 is in the closed, or normal condition, the voltage $V_{L1}$ across a first load device 15 is equal to the voltage $V_{L2}$ across a second load device 16, regardless of the resistance value of each load device 15 and 16. When switch 14 is in the open condition, signifying an open neutral line condition, the voltage across the series connected combination of first and second load resistances 15 and 16 is equal to the vector sum of $Vs_1$ and $Vs_2$, or twice the normal line-to-neutral voltage. The voltage across each of the first and second load resistances will no longer be equal, the value of each load voltage being determined by the power rating or resistance of the associated load; the higher resistance load having the proportionally greater voltage appearing thereacross. Illustratively, if first load device 15 has a resistance value of 100 ohms and if second load device 16 has a resistance value of 50 ohms, then for the frequently used 240 volt line-to-line supply voltage from phase A conductor 11 to phase B conductor 12, the load voltage $V_{L1}$ across first load 15 is 160 volts while the second load voltage $V_{L2}$ across second load device 16 is 80 volts. Thus, it can be seen that the higher resistance load device, here load 15, is subject to a severe overvoltage condition with its associated higher current and power dissipation. Such excessive conditions usually result in the destruction of the load device. The second load device 16 is subject to a severe undervoltage, with the associated lower current and lower power dissipation. This severe undervoltage may damage second load device 16. In either event, those load devices utilizing connection to neutral line 13 for some degree of personnel shock protection are now floated above ground potential and pose a severe personnel shock hazard.

FIG. 2 illustrates an identical three-wire, single-phase energy supply circuit having suitable means 20 for substantially simultaneously interrupting the flow of current in both phase A conductor 11 and phase B conductor 12, respectively, responsive to the activation of trip means 21 by open-neutral comparator means 22 in the event neutral line 13 is broken or presents a high resistance path to earth ground.

A voltage divider 24, comprising an electrical series circuit of first impedance 25 and second impedance 26 is connected between phase A first conductor 11 and phase B second conductor 12. Voltage divider 24 is designed with equal first and second impedances 25 and 26 and a voltage at the junction 28 therebetween is always equal to zero volts, as the voltage on phase A first conductor 11 is of equal magnitude but opposite phase to the voltage on phase B second conductor 12. It should be understood that first and second impedances 25 and 26 may be any series-parallel combination of electrical resistance, capacitance and inductance desired, so long as the magnitude and sign of the real and imaginary parts of each are equal. In a preferred embodiment, each impedance consists of a single resistive element, the value of the resistive elements being substantially equal.

Open-neutral comparator means 22 has a first input 22a coupled to neutral line 13 as extended to the common junction between first and second loads 15 and 16; a second input 22b coupled to the artificial neutral voltage $V_{an}$ at divider junction 28; and an output 22c energized in the event the neutral line voltage $V_n$ differs from the artificial line voltage $V_{an}$ by more than a predetermined value. A circuit breaker 20 of a well-known type includes a first and a second set of separable contacts 20a and 20b, respectively, and trip means 21 coupled to the first and second separable contact sets to separate the contacts when trip means 21 is energized. Phase A first conductor 11 is connected to a first contact 30a of first separable contact set 20a, whose other contact 30b is connected via phase A load cable 32 to load 15; phase B second conductor 12 is connected to first contact 34a of second contact set 20b whose other contact 34b is connected via second load cable 35 to load 16. Neutral line 13 is connected to the junction 17 formed between the common leads of loads 15 and 16. One lead 21a of trip means 21 is connected to phase A conductor 11 while the other trip means lead 21b is connected to comparator means output 22c.

In the normal condition, neutral line 13 is continuous and presents a low resistance path to earth ground; neutral line voltage $V_n$ is essentially zero. The essentially zero neutral line voltage is compared to the essentially zero artificial neutral voltage $V_{an}$ by comparator means 22 and, as the difference between the two voltages $V_n$ and $V_{an}$ is less than the predetermined value, comparator means output 22c is maintained in the de-energized condition whereby current does not flow through from phase B conductor 12 through comparator means 22 and trip means 21 to phase A conductor 11. Thus, in the normal condition, circuit breaker contact sets 20a and 20b are unaffected by trip means 21.

In the protected condition, an open-circuit or a high series resistance condition has been formed in neutral line 13 between the energy source (not shown) and comparator first input 22a, which preferably attaches to neutral line 13 as close to load junction 17 as possible to provide maximum protection, to cause neutral line voltage $V_n$ to deviate from zero volts. Comparator means 22 energizes output 22c to the voltage $V_{s2}$ on phase B conductor 12 when the difference between neutral line voltage $V_n$ and essentially zero artificially derived voltage $V_{an}$ is greater than the predetermined value, causing a current to flow from phase A first conductor 11 through conductor 37 and trip means 21 through comparator output 22c to phase B conductor 12, thereby substantially simultaneously separating both contact sets 20a and 20b and interrupting the flow of current in first and second load conductors 32, 35, respectively, to loads 15, 16, respectively.

Referring now to FIG. 3, an open-neutral-line protection circuit in accordance with the above-stated principle, having like reference numerals used for like elements, having comparator means 22 capable of interrupting the current flow in load conductors 32 and 35 even when loads 15 and 16 are not connected therefrom to neutral line 13, includes, in a preferred embodiment, a first and a second PNP transistor 41 and 42, respectively. The emitter electrode 41e of first transistor 41 is coupled through a first resistor 44 to the first transistor base electrode 41b; the emitter electrode 42e of second transistor 42 is coupled through a second resistor 45 to the second transistor base electrode 42b; and the first transistor collector electrode 41c and second transistor collector electrode 42c are electrically parallel connected to one another. First transistor base electrode 41b and second transistor emitter electrode 42e are coupled through a first and a second protection diode 47, 48, respectively, to neutral line 13. First transistor emitter electrode 41e and second transistor base electrode 42b are parallel coupled to artificial neutral junction 28. The value of resistances 44 and 45 are substantially equal and are predeterminately selected to determine the voltage difference between the artificial neutral voltage at junction 28 and the line neutral voltage on neutral line 13 which will cause either transistor 41 (the negative polarity comparator) or transistor 42 (the positive polarity comparator) to activate. A resistor 46 is connected between either load conductor 32 or 35 and neutral line 13 to insure that $V_n$ exceeds the predetermined value for both the open and high resistance neutral line conditions, in the event no loads are connected between the load conductors and the neutral line. Thus, in the normal condition, the neutral line $V_n$ and the artificial neutral voltage $V_{an}$ at junction 28 are both substantially equal to zero volts, whereby neither first protection diode 48 conducts and no voltage is formed across either resistance 44 or resistance 45; the base-to-emitter voltages ($V_{be}$) of both transistors 41 and 42 are essentially zero, thereby maintaining both transistors in the cut-off state with no current flowing from either collector electrode 41c or 42c towards the anode of third protection diode 49. No current flows through resistor 50 to capacitor 51 which capacitor acts as a filter to prevent random transients from causing a diac 52 to trigger a silicon controlled rectifier 53. The non-conducting silicon controlled rectifier prevents a flow of current from load conductor 32 through the solenoid coil of trip means 21, whereby first and second contact sets 20a and 20b of circuit breaker 20 remain in their initially closed positions.

When an open circuit or high resistance condition is formed in series with neutral line 13 at a point between an energy supply source (not shown) and comparator means first input 22a, which is the point at which the cathode of first protection diode 47 and the anode of second protection diode 48 are connected to neutral line 13, the voltage at comparator means first input 22a will either increase or decrease from the normal condition of neutral line voltage $V_n$ equalling zero, unless both load impedances are substantially equal, in which condition proper voltages, equal to the line-neutral voltage, appear across each load and only change in either load impedance resulting in a non-zero voltage at firs input 22a. As the neutral line voltage increases, a voltage is reached sufficient to forward bias second protection diode 48 to cause a flow of current through second resistance 45 to junction 28, at which junction the artificial neutral voltage $V_{an}$ is maintained at zero volts. As the neutral line voltage continues to increase, a voltage is reached at which the current flowing through resistance 45 causes a sufficiently large voltage to appear between the second transistor emitter and base electrodes 42e and 42b, respectively, which voltage biases transistor 42 in the active state, whereby a flow of current from collector electrode 42c is induced into the anode of third protection diode 49. Conversely, as neutral line voltage decreases, a voltage is reached sufficient to forward bias first protection diode 47 to cause a flow of current from junction 28 through first resistance 44; a neutral line voltage is soon reached at which the current flowing through resistance 44 generates a voltage between the first transistor emitter and base electrodes, 41e and 41b, respectively, sufficient to bias transistor 41 in the active state and cause a flow of current from collector electrode 41a into the anode of third protection diode 49. Diode 49 now conducts and capacitor 51 charges through resistor 50. The time constant of the integrator formed by resistance 50 and capacitance 51 is predeterminately selected to be long enough to prevent a transient from increasing the voltage across capacitor to the voltage required to turn on diac 52. In the non-transient open neutral line condition, transistor 41 or transistor 42 conducts for a sufficient period of time to allow the voltage across capacitor 51 to reach the turn-on voltage of diac 52, at which voltage diac 52 conducts and allows a flow of current through resistance 54. The voltage across resiistance 54, responsive to this flow of current therethrough, is coupled to the gate electrode of SCR 53, causing SCR 53 to conduct and allow a flow of current from first load conductor 32 through trip means solenoid 21 and SCR 53 to second load conductor 35, thereby causing both circuit breaker contact sets 20a and 20b to substantially simultaneously separate and interrupt the flow of current in both first and second load conductors 32 and 35 and any loads attached thereto. Protection diodes 47 and 48 prevent any reverse voltage between first transistor base electrode 41b and second emitter electrode 42e from exceeding the two diode forward-voltage drops, thus protecting the base-emitter junctions of transistors 41 and 42 from damage.

There has just been described a novel method and apparatus for interrupting the flow of current in a three-wire, single-phase energy supply circuit in the event an open neutral line condition is created even when loads are not connected between either or both of the energized lines to the neutral line.

The present invention has been described with a preferred embodiment thereof; many variations and modifications will become apparent to those skilled in the art. It is preferred, therefore, that the present invention be limited not by the specific disclosure herein, but only by the appended claims.

What is claimed is:

1. An apparatus for protecting a three-wire, single-phase energy supply circuit having a pair of energized lines and a neutral line in the event of an open neutral line condition, said apparatus comprising:
   first means coupled to said energized line pair for generating an artificial neutral voltage at an output thereof;
   second means coupled to said first means output and to said neutral line for comparing the amplitudes of said artificial neutral voltage and a voltage on said neutral line, said second means having an output adapted to be energized in the event said artificial neutral and neutral line voltages differ by at least a predetermined value from one another;
   circuit means for interrupting the flow of current in said energized line pair responsive to the energization of said second means output;
   said first means including first and second impedances each having a real and imaginary part, the real part of each of said first and second impedances having essentially equal magnitudes; the imaginary part of each of said first and second impedances having essentially equal magnitudes and signs;
   said first impedance having a first and a second terminal, said first impedance first terminal being coupled to one of said energized lines;
   said second impedance having a first and a second terminal, said second impedance first terminal being coupled to the other of said energized lines;
   said first and second impedances second terminals being coupled each to the other to form an output junction;
   said artificial neutral voltage being the voltage at said output junction;
   said circuit interruption means including a circuit interrupter having first and second sets of separable contacts and trip means; each of said sets coupled in electrical series connection with one of said energized lines; said trip means coupled to said second means output for substantially simultaneously separating both sets of said contacts in the event said second means output is energized, thereby interrupting a flow of current in said energized line pair responsive to said open neutral line condition;
   said second means including first and second comparator means, each having a first input, a second input and an output; said first comparator means output adapted to be energized in the event a voltage at said first comparator means first input exceeds a voltage at said first comparator means second input by said predetermined value; said second comparator means output adapted to be energized in the event a voltage at said second comparator second input exceeds a voltage at said second comparator means first input by essentially the same predetermined value;

said first comparator means second input and said second comparator means first input coupled to said first means output; and said first and second comparator means outputs coupled each to the other and the junction therebetween coupled to said second means output, whereby said second means output is energized whenever said neutral line and first neutral voltages differ from each other by said predetermined value.

2. Apparatus as set forth in claim 1, wherein said second means further includes means coupled between said second means output and said comparator means output junction for delaying the energization of said second means output for a predetermined time interval after the energization of said comparator means output, whereby a transient energization signal of time duration less then said predetermined time interval does not energize said second means output.

3. Apparatus as set forth in claim 2, wherein said second means further includes means coupled between said second means output and said delay means for amplifying the energization signal at said second means output responsive to an energization of a delay means output.

4. Apparatus as set forth in claim 3, wherein said first and second comparator means each comprise a semiconductor element having first, second and control electrodes, said control electrode forming said comparator means first input, said first electrode forming said comparator means output responsive to the difference in voltage between said first and control electrodes; and a resistance element coupled between said first and control electrodes to predetermine the value of voltage differences between said first and second inputs necessary for said second electrode to be energized.

5. Apparatus as set forth in claim 4, wherein said delay means is an R-C network having an input coupled to said comparator means output junction and an output coupled to said second means output and having a line constant predetermined selected to delay the energization of said second means output by said predetermined time interval.

6. Apparatus as set forth in claim 5, wherein said amplifying means includes a semiconductor controlled rectifier having first and second primary electrodes and a gate electrode, said first primary electrode coupled to one energized line through said trip means, said second primary electrode coupled to the other energized line; and semiconductor trigger means coupled between said gate electrode and said delay means output for controlling said rectifier to conduct between said first and second primary electrodes responsive to the energization of said delay means output.

7. Apparatus as set forth in claim 6, wherein said second means further includes a unilateral semiconductor switching element in electrical series connection with each comparator input coupled to said neutral line and in electrical series connection with said comparator output junction to protect said semiconductor elements from reverse voltage effects.

* * * * *